United States Patent
Kim et al.

(10) Patent No.: US 9,696,559 B2
(45) Date of Patent: Jul. 4, 2017

(54) MULTIVIEW IMAGE DISPLAY SYSTEM AND DRIVING METHOD THEREOF

(71) Applicant: SAMSUNG DISPLAY CO., LTD., Yongin, Gyeonggi-Do (KR)

(72) Inventors: Kang-Min Kim, Hwaseong-si (KR); Seon Ki Kim, Yongin-si (KR); Se Huhn Hur, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 43 days.

(21) Appl. No.: 14/666,421

(22) Filed: Mar. 24, 2015

(65) Prior Publication Data

US 2016/0091725 A1 Mar. 31, 2016

(30) Foreign Application Priority Data

Sep. 25, 2014 (KR) .................. 10-2014-0128504

(51) Int. Cl.
*G02F 1/1335* (2006.01)
*G02F 1/13363* (2006.01)
(Continued)

(52) U.S. Cl.
CPC ......... *G02B 27/2264* (2013.01); *G02B 27/26* (2013.01); *G02F 1/13363* (2013.01);
(Continued)

(58) Field of Classification Search
CPC .......... H04N 13/0438; H04N 13/0497; H04N 13/0434; H04N 13/0447; H04N 13/0468; H04N 13/0456; H04N 13/0059; H04N 13/0452; H04N 13/0429; H04N 13/0484; H04N 13/00; H04N 13/0003; H04N 13/0018; H04N 13/0033; H04N 13/047; H04N 13/0007; H04N 13/044; H04N 13/0445; H04N 13/045; H04N 13/0475; H04N 13/0477; H04N 13/0479;
(Continued)

(56) References Cited

U.S. PATENT DOCUMENTS 3,975,085 A * 8/1976 Yamada ............... G09G 3/3622
345/50
5,821,989 A * 10/1998 Lazzaro ................. G03B 21/30
348/53
(Continued)

FOREIGN PATENT DOCUMENTS

KR 1020100111082 10/2010
KR 1020100122661 11/2010
(Continued)

*Primary Examiner* — Thoi Duong
(74) *Attorney, Agent, or Firm* — F. Chau & Associates, LLC

(57) ABSTRACT

A multiview image displaying system is provided. The multiview image displaying system includes: a display panel, a shutter panel, a shutter panel, and glasses. The display panel is for displaying images for different viewpoints by time division and includes a first polarizer. The shutter panel is provided in front of the display panel and includes an active shutter panel and a phase retardation plate. The glasses are for observing the images. The glasses are selected from among polarized glasses and shutter glasses.

24 Claims, 15 Drawing Sheets

(51) Int. Cl.
*G02B 27/22* (2006.01)
*G02B 27/26* (2006.01)
*H04N 13/04* (2006.01)

(52) U.S. Cl.
CPC ..... *G02F 1/133528* (2013.01); *H04N 13/044* (2013.01); *G02F 2001/133638* (2013.01)

(58) Field of Classification Search
CPC ......... H04N 19/597; H04N 2013/0465; H04N 9/8063; H04N 2213/008; H04N 21/2365; H04N 21/236; H04N 21/4307; H04N 5/04; G09G 5/14; G09G 2310/0278; G09G 2310/027; G09G 2310/0275; G09G 3/3648; G09G 3/3677; G02B 27/26; G02B 27/2264; G02B 27/225; G02B 27/22; G02F 1/1335; G02F 1/133528; G02F 1/13306; G02F 1/13363; G02F 1/1347; G02F 1/1395; G02F 2001/133638
USPC ................ 345/213, 99; 348/51, 564, 42, 56, 348/E13.026, 53, 55; 349/15, 1, 117, 96, 349/13; 353/8, 20, 7; 359/464, 462, 466
See application file for complete search history.

(56) References Cited

U.S. PATENT DOCUMENTS

| 6,975,345 | B1 | 12/2005 | Lipton et al. | |
|---|---|---|---|---|
| 9,316,843 | B2* | 4/2016 | Ishiguro | G02B 27/2264 |
| 2007/0046861 | A1* | 3/2007 | Morita | G02F 1/13471 |
| | | | | 349/95 |
| 2013/0107145 | A1* | 5/2013 | Ueki | G02B 27/2264 |
| | | | | 349/13 |
| 2013/0141654 | A1* | 6/2013 | Lee | G02B 27/26 |
| | | | | 349/15 |

FOREIGN PATENT DOCUMENTS

| KR | 1020110027538 | 3/2011 |
|---|---|---|
| KR | 1020110050178 | 5/2011 |
| KR | 1020110107531 | 10/2011 |
| KR | 1020140003145 | 1/2014 |
| WO | 2012024174 | 2/2012 |

* cited by examiner (a)Polarized glasses (b)Shutter glasses

MULTIVIEW IMAGE DISPLAY SYSTEM AND DRIVING METHOD THEREOF

CROSS-REFERENCE TO RELATED APPLICATION

This application claims priority to and the benefit of Korean Patent Application No. 10-2014-0128504 filed in the Korean Intellectual Property Office on Sep. 25, 2014, the disclosure of which is incorporated by reference herein.

BACKGROUND (a) Technical Field

Embodiments of the present inventive concept relate to an image displaying system, and more particularly to a multiview image displaying system using glasses, and a driving method thereof.

(b) Discussion of Related Art

A three-dimensional (3D) stereoscopic image display device is a display device capable of conveying depth perception to a viewer. A 3D effect of an object may be expressed by using binocular parallax which is the largest factor with regard to recognizing the 3D effect in a short range. That is, when a 2D image is presented to the left eye (hereinafter referred to as a "left eye image") and a 2D image is presented to the right eye (hereinafter referred to as a "right eye image"), the left eye image and the right eye image are fused in the brain to be recognized as a 3D image having depth perception or a 3D effect.

A multiview image display device such as a 3D image display device uses disparity at different viewpoints, and uses a stereoscopic method or an autostereoscopic method that disposes a lenticular lens or a parallax barrier on the display device without using glasses.

A stereoscopic multiview image displaying system uses glasses such as shutter glasses or polarized glasses, which prevents image resolution deterioration since the glasses distinguish images from respective viewpoints.

In the polarized glasses method, different polarizing images are displayed on a display panel through a polarizer of the polarized glasses, thereby displaying stereoscopic images. In the shutter glasses method, left-eye images and right-eye images are consecutively output from the display panel in a separate manner, and a left eye shutter and a right eye shutter of the shutter glasses are selectively opened and shut to enable perception of 3D images.

SUMMARY

At least one embodiment of the present inventive concept provides a multiview image displaying system capable of working with either polarized glasses or shutter glasses and a method of using the same.

An exemplary embodiment of the present inventive concept provides a multiview image displaying system including: a display panel for displaying images for different viewpoints by time division and including a first polarizer; a shutter panel provided in front of the display panel and including an active shutter panel and a phase retardation plate; and glasses for observing the images, wherein the glasses are selected from among polarized glasses and shutter glasses.

In an exemplary embodiment, the multiview image displaying system further includes a shutter panel driver for supplying a voltage to the shutter panel so that the shutter panel is synchronized with the display panel, and alternately realizes a 0-degree phase difference and a half-wave phase difference when the polarized glasses are selected.

In an exemplary embodiment, the polarized glasses include a first glass and a second glass, the first glass and the second glass respectively include a phase delay unit and a polarizer, the phase delay unit includes a quarter wave plate or a quarter wave film and a transmissive axis of the polarizer included by the first glass substantially corresponds to a transmissive axis of the polarizer included by the second glass.

In an exemplary embodiment, an optical axis of the phase delay unit included by the first glass and an optical axis of the phase delay unit included by the second glass form an angle of substantially 90 degrees.

In an exemplary embodiment, the phase retardation plate includes a quarter wave plate, and an optical axis of the phase retardation plate is substantially parallel with one of the optical axis of the phase delay unit included by the first glass and the optical axis of the phase delay unit included by the second glass, and it forms an angle of substantially 90 degrees with the other thereof.

In an exemplary embodiment, the multiview image displaying system further includes a shutter panel driver for supplying a voltage to the shutter panel so that the shutter panel constantly realizes substantially a 0-degree phase difference when the shutter glasses are selected.

In an exemplary embodiment, the shutter glasses include a first glass and a second glass, the first glass and the second glass respectively include a phase delay unit, a shutter, and a polarizer, the phase delay unit includes a quarter wave plate or a quarter wave film and a transmissive axis of the polarizer included by the first glass substantially corresponds to a transmissive axis of the polarizer included by the second glass.

In an exemplary embodiment, an optical axis of the phase delay unit included by the first glass is substantially parallel with an optical axis of the phase delay unit included by the second glass.

In an exemplary embodiment, the shutter is alternately turned on and off in synchronization with the display panel to alternately provide different phase differences to incident light.

In an exemplary embodiment, the phase retardation plate includes a quarter wave plate.

In an exemplary embodiment, the multiview image displaying system further includes: a display panel driver for driving the display panel; and a signal controller for controlling the display panel driver and the shutter panel driver, wherein the signal controller is operable by a selection signal indicating which one of the polarized glasses and the shutter glasses is selected.

In an exemplary embodiment, the shutter panel driver supplies a polarity inverted voltage to the shutter panel when the shutter glasses are selected.

In an exemplary embodiment, when the shutter glasses are selected, an overvoltage is added for a predetermined time to the polarity inverted voltage supplied by the shutter panel driver.

In an exemplary embodiment, the display panel further includes a backlight unit, and a time in which the polarity inverted voltage (e.g., a polarity inverting time) is supplied by the shutter panel driver overlaps a time period in which the backlight unit is turned off.

An exemplary embodiment of the present inventive concept provides a method for driving a multiview image displaying system. The method includes: driving a display panel to alternately display images of different viewpoints;

supplying a polarity inverted voltage to a shutter panel provided in front of the display panel to generate a predetermined phase difference; and driving shutter glasses to allow an image that has passed through the shutter panel to pass through the shutter glasses, wherein the shutter glasses include a first glass and a second glass, the first glass and the second glass respectively include a phase delay unit, a shutter, and a polarizer, the phase delay unit includes a quarter wave plate or a quarter wave film and a transmissive axis of the polarizer included by the first glass substantially corresponds to a transmissive axis of the polarizer included by the second glass.

In an exemplary embodiment, an optical axis of the phase delay unit included by the first glass is substantially parallel with an optical axis of the phase delay unit included by the second glass.

In an exemplary embodiment, the method further includes alternately turning on and off the shutter in synchronization with the display panel to alternately provide different phase differences to incident light.

In an exemplary embodiment, the method further includes adding an overvoltage for a predetermined time to the polarity inverted voltage supplied.

In an exemplary embodiment, the display panel further includes a backlight unit, and the method includes alternately turning on and off the backlight unit.

In an exemplary embodiment, a time period (e.g., a polarity inverting time) in which the polarity inverted voltage supplied to the shutter panel overlaps a time period in which the backlight unit is turned off.

According to an exemplary embodiment of the inventive concept, a display device includes a display panel, a first polarizer formed on a first side of the display panel, an active shutter panel formed on the polarizer and configured to impart one of a phase difference of 0 degree and a phase difference of a half wave to light passing through the shutter panel according to a supplied voltage, and a quarter wave plate formed on the polarizer.

In an exemplary embodiment, the display device further includes a second polarizer formed on a second other side of the display panel opposing the first side, wherein transmissive axes of the polarizers are orthogonal to each other.

In an exemplary embodiment, the display device includes a driver configured to supply a first voltage to the active shutter panel to constantly impart the 0 degree phase difference in response to a signal indicating that a user is using polarized glasses, and supply a second other voltage to the active shutter panel to continuously alternate between imparting the 0 degree phase difference and the half wave phase difference in response to a signal indicating a user is using shutter glasses.

In an exemplary embodiment, the display device includes a transceiver configured to receive the signal wirelessly from the polarized glasses or the shutter glasses.

According to at least one exemplary embodiment of the present inventive concept, multiview images may be observed by selecting polarized glasses or shutter glasses.

DETAILED DESCRIPTION

Figure 1:
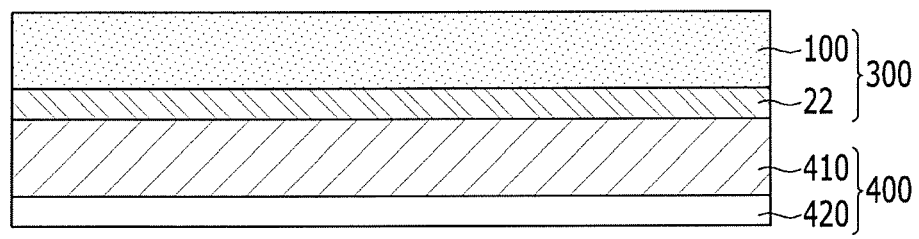
FIG. 1 and FIG. 2 show cross-sectional views of a multiview image displaying system according to an exemplary embodiment of the present inventive concept.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Please note that while parameters will be described below as having substantially a certain value (e.g., a particular angle, phase, etc.), in alternate embodiments, these parameters are exactly the certain value, or approximately the certain value. Further, while embodiments of the inventive concept will be described with respect to a multiview image display device, in alternate embodiments, the image display device can be a singleview image display device.

A multiview image displaying system according to an exemplary embodiment of the present inventive concept will now be described with reference to FIG. 1 to FIG. 4.

Figure 2:
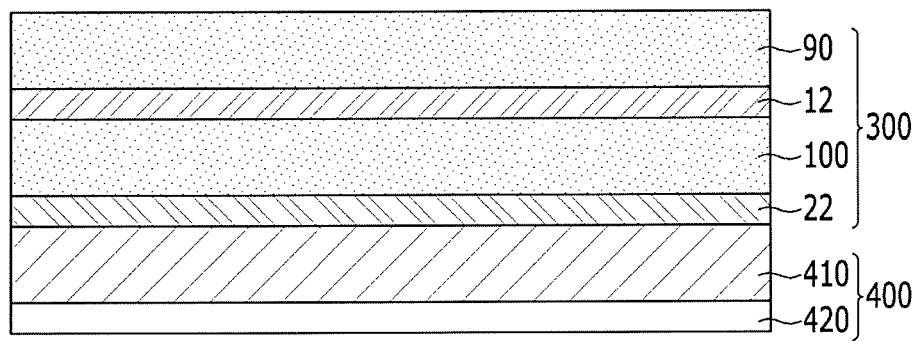
Figure 3:
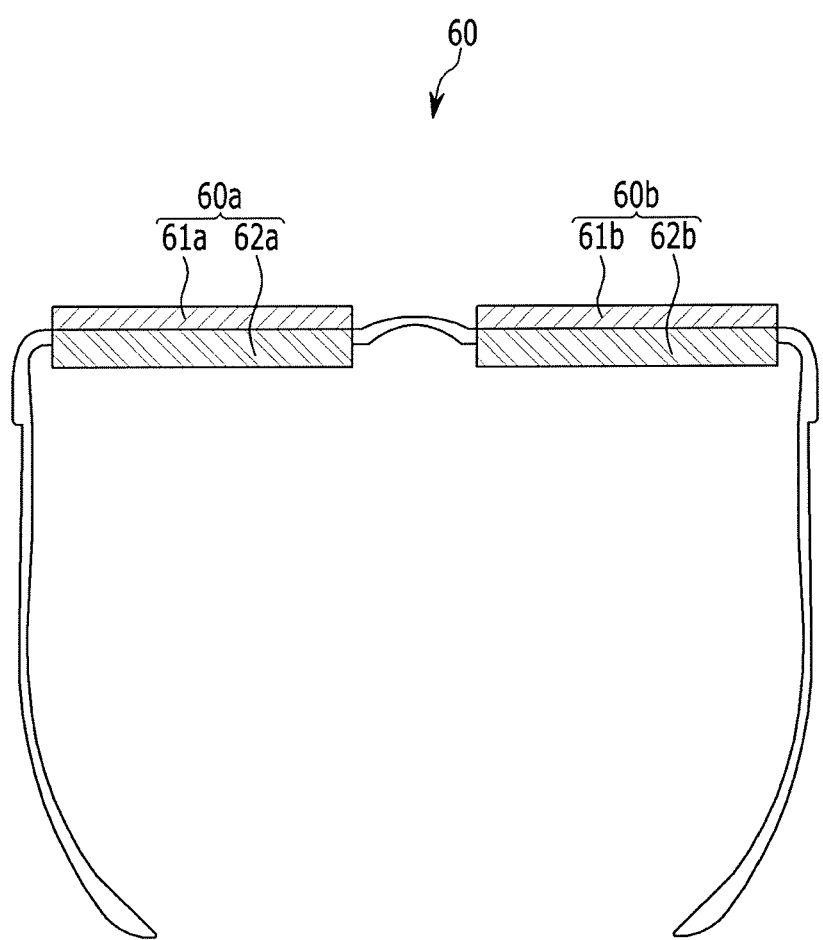
FIG. 3 shows a cross-sectional view of polarized glasses used by a multiview image displaying system according to an exemplary embodiment of the present inventive concept.
Figure 4:
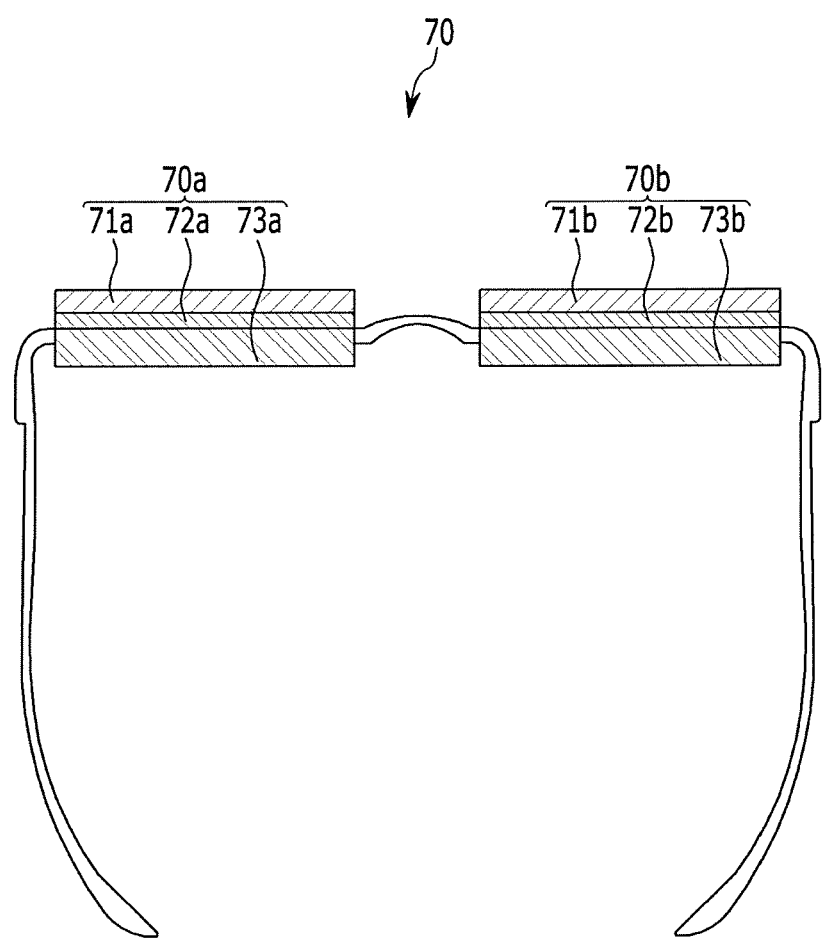
FIG. 4 shows a cross-sectional view of shutter glasses used by a multiview image displaying system according to an exemplary embodiment of the present inventive concept.

FIG. 1 and FIG. 2 show cross-sectional views of a multiview image displaying system according to an exemplary embodiment of the present inventive concept, FIG. 3 shows a cross-sectional view of polarized glasses used by a multiview image displaying system according to an exemplary embodiment of the present inventive concept, and FIG. 4 shows a cross-sectional view of shutter glasses used by a multiview image displaying system according to an exemplary embodiment of the present inventive concept.

Referring to FIG. 1 and FIG. 2 the multiview image displaying system includes a display panel 300 and a shutter panel 400.

The display panel 300 displays an image. The display panel 300 can display 2D images or 3D images, or can display different images that will be displayed at different viewpoints by temporal division. Particularly, when displaying the 3D image, the display panel 300 displays the left-eye image to be input to the left eye of the observer and the right-eye image to be input to the right eye of the observer by temporal division.

The display panel 300 includes a plurality of electrical elements for displaying an image, for example, an active substrate 100 including a plurality of signal lines and a plurality of pixels PX connected thereto, and a first polarizer 22 attached to the active substrate 100. In an exemplary embodiment, the first polarizer 22 linearly polarizes incident light in a direction that is parallel to a transmissive axis. For example, the first polarizer 22 can be a linear polarizer such as a wire-grid polarizer, an absorptive polarizer, a beam-splitting polarizer, a birefringent polarizer, or a thin film polarizer. The first polarizer 22 is provided between the active substrate 100 and the shutter panel 400.

The display panel 300 can be various sorts of display panels such as an organic light emitting panel including an organic light emitting element or a liquid crystal panel including a liquid crystal layer.

Referring to FIG. 2, when the display panel 300 according to an exemplary embodiment of the present inventive concept is a liquid crystal panel, the display panel 300 includes the first polarizer 22 and a second polarizer 12 provided on respective sides of the active substrate 100. In an exemplary embodiment, the second polarizer 12 is also a linear polarizer. Particularly, a polarizer provided between the active substrate 100 and the shutter panel 400 is called a first polarizer 22. Transmissive axes of the polarizers 12 and 22 are orthogonal to each other.

The display panel 300 further includes a backlight unit 90 for providing light to the active substrate 100.

In the case of a liquid crystal panel, the active substrate 100 of the display panel 300 includes a sealed liquid crystal layer (not shown). The liquid crystal layer has dielectric anisotropy, and it controls a polarization change degree of the light that is input to the liquid crystal layer to control transmittance of the display panel 300.

The shutter panel 400 is located adjacent to the display panel 300, and is provided on a side of the display panel 300 for displaying the image.

The shutter panel 400 includes an active shutter panel 410 and a phase retardation plate 420.

The active shutter panel 410 is located adjacent to the display panel 300.

The active shutter panel 410 imparts a phase difference of 0 degree or a half wave ($\lambda/2$) to light passing through the panel 410 according to a supplied voltage. In an exemplary embodiment, the active shutter panel 410 is switched and driven to alternately provide the phase difference of 0 degree and a half wave according to selection of glasses modes, or it constantly imparts the phase difference of 0 degree for a predetermined time. When the active shutter panel 410 is switched and driven to alternately impart the phase difference of 0 degree and a half wave, switching timing is synchronized with timing for displaying an image at a different viewpoint displayed by the display panel 300.

The active shutter panel 410 may be realized with various methods. For example, the active shutter panel 410 may include a liquid crystal layer (not shown) and an electrode for controlling the same. The liquid crystal layer included by the active shutter panel 410 includes various modes of liquid crystal molecules, for example, liquid crystal molecules in an optically compensated bend (OCB) mode.

When the active shutter panel 410 is turned off, a half-wave phase difference is generated, and when the active shutter panel 410 is turned on, the phase difference of 0 degree is generated. When the active shutter panel 410 continuously generates the phase difference of 0 degree, the active shutter panel 410 is driven to be at the on state. This, if the active shutter panel 410 is turned on and off repeatedly for a certain period, the phase difference alternates between the 0 degrees and the half-wave during the period.

The phase retardation plate 420 is provided on an external side of the active shutter panel 410, that is, an opposite side of the display panel 300. In an exemplary embodiment, the phase retardation plate 420 is an optical device that alters the polarization state of a light wave travelling through the device. In an exemplary embodiment, the optical device is constructed out of a birefringent material such as quartz or mica, but is not limited thereto.

In an exemplary embodiment, the phase retardation plate 420 is a quarter wave plate for providing a phase delay of ¼ wavelength to transmission light. When the image displayed by the display panel 300 is passed through the active shutter panel 410 and is passed through the phase retardation plate 420, it is circularly polarized and then output.

Referring to FIG. 3 and FIG. 4, the multiview image displaying system further includes glasses used by an observer. The glasses include polarized glasses 60 shown in FIG. 3 or shutter glasses 70 shown in FIG. 4. The observer selects a glasses mode for selecting whether the polarized glasses 60 or the shutter glasses 70 are used to observe the 3D image, and then selects the polarized glasses 60 shown in FIG. 3 or the shutter glasses 70 shown in FIG. 4 according to the selected glasses mode.

Since the multiview image displaying system according to an exemplary embodiment of the present inventive concept enables the observer to select either of the polarized glasses 60 and the shutter glasses 70, benefits attributed to each of the glasses are available.

Referring to FIG. 3, the polarized glasses 60 includes a left glass 60a and a right glass 60b.

The left glass 60a includes a phase delay unit 61a and a polarizer 62a, and the right glass 60b includes a phase delay unit 61b and a polarizer 62b. In an exemplary embodiment, a phase delay unit is designed to delay linear polarization to circular polarization.

The polarizer 62a is provided to be close to the left eye of the observer, and the phase delay unit 61a is attached to the outside of the polarizer 62a. In a like manner, the polarizer 62b is provided to be close to the right eye of the observer, and the phase delay unit 61b is attached to the outside of the polarizer 62b.

In an exemplary embodiment, the phase delay unit 61a and the phase delay unit 61b are a quarter wave film or a quarter wave plate for a phase delay that is an odd number multiple of the one quarter wave ($\lambda/4$). A difference of phase delay values between the phase delay unit 61a and the phase delay unit 61b is a half wave ($\lambda/2$). For example, when a phase delay value of the phase delay unit 61a is a one quarter wave ($\lambda/4$) with respect to the same transmissive axis, a phase delay value of the phase delay unit 61b is a three quarter wave (3λ/4) or vice versa.

When the phase delay unit 61a and the phase delay unit 61b are quarter wave films or quarter wave plates, an optical axis or a slow axis of the phase delay unit 61a is +45 degrees with respect to the transmissive axis and an optical axis of the phase delay unit 61b is −45 degrees (or +135 degrees) with respect to the same transmissive axis. That is, the optical axis of the phase delay unit 61a and the optical axis of the phase delay unit 61b form an angle of substantially 90 degrees.

The transmissive axes of the polarizer 62a and the polarizer 62b are the same, and are parallel with or perpendicular to the transmissive axis of the first polarizer 22 included in the display panel 300.

The polarized glasses 60 have no shutter function and allow the left eye and the right eye to observe different images according to a polarization state of the light that is input to the polarized glasses 60.

Referring to FIG. 4, the shutter glasses 70 include a left glass 70a and a right glass 70b.

The left glass 70a includes a phase delay unit 71a, left-eye shutter 72a, and a polarizer 73a, and the right glass 70b includes a phase delay unit 71b, a right-eye shutter 72b, and a polarizer 73b.

The polarizer 73a is provided nearest the left eye of the observer, the phase delay unit 71a is provided farthest from the left eye, and the left-eye shutter 72a is provided between the phase delay unit 71a and the polarizer 73a.

In a like manner, the polarizer 73b is provided nearest the right eye of the observer, the phase delay unit 71b is provided farthest from the right eye, and the right-eye shutter 72b is provided between the phase delay unit 71b and the polarizer 73b.

The phase delay unit 71a and the phase delay unit 71b are a quarter wave film or a quarter wave plate for generating a phase delay that is an odd-number multiple of the one quarter wave (λ/4), respectively. A difference of the phase delay values between the phase delay unit 71a and the phase delay unit 71b is 0 degree. For example, with respect to the same transmissive axis, the phase delay value of the phase delay unit 71a and the phase delay value of the phase delay unit 71b are a one quarter wave (λ/4) or a three quarter wave (3λ/4).

For this, the optical axis of the phase delay unit 71a and the optical axis of the phase delay unit 71b form +45 degrees or −45 degrees (or +135 degrees) with respect to the linear polarization transmissive axis. The optical axis of the phase delay unit 71a and the optical axis of the phase delay unit 71b form 90 degrees with respect to the optical axis of the phase retardation plate 420 of the shutter panel 400, and without being restricted to this, they can be parallel with each other. The present exemplary embodiment will show an example in which the optical axis of the phase delay unit 71a and the optical axis of the phase delay unit 71b form an angle of substantially 90 degrees with respect to the optical axis of the phase retardation plate 420 of the shutter panel 400.

The left-eye shutter 72a and the right-eye shutter 72b are switched on/off according to the voltage supplied to an active shutter (e.g., 410). The left-eye shutter 72a or right-eye shutter 72b changes the polarization direction of the incident light when it is turned on, and it does not change the polarization direction of the incident light when it is turned off. For example, when the left-eye shutter 72a or the right-eye shutter 72b is turned on, the phase difference of a half wave (λ/2) is provided to change the polarization state of the incident light by 90 degrees.

When the shutter glasses 70 are used, the multiview image displaying system according to an exemplary embodiment of the present inventive concept allows a multiview display mode in which observers at different times observe different images, and in this case, the left-eye shutter 72a and the right-eye shutter 72b are simultaneously turned on/off. Differing from this, when the multiview image displaying system displays a 3D image, the left-eye shutter 72a and the right-eye shutter 72b are alternately turned on/off.

The left-eye shutter 72a and the right-eye shutter 72b may be realized as various systems, and for example, may include a liquid crystal layer (not shown) and an electrode for controlling the same.

The polarizer 73a and the polarizer 73b have a same transmissive axis, and the transmissive axis is parallel with or perpendicular to the transmissive axis of the first polarizer 22.

When the multiview image displaying system uses the shutter glasses 70, the multiview image displaying system further includes a shutter driver (not shown) for driving the shutter glasses 70, a battery, a signal transceiver, and a multiview headset. That is, when the shutter glasses 70 are used, the multiview image displaying system is used with further various modes, for example, a multiview display mode and a 3D image display mode.

A principle for displaying an image when a multiview image displaying system according to an exemplary embodiment of the present inventive concept uses the polarized glasses 60 will now be described with reference to FIG. 5 to FIG. 8 together with the above-described FIG. 1 to FIG. 4.

Figure 5:
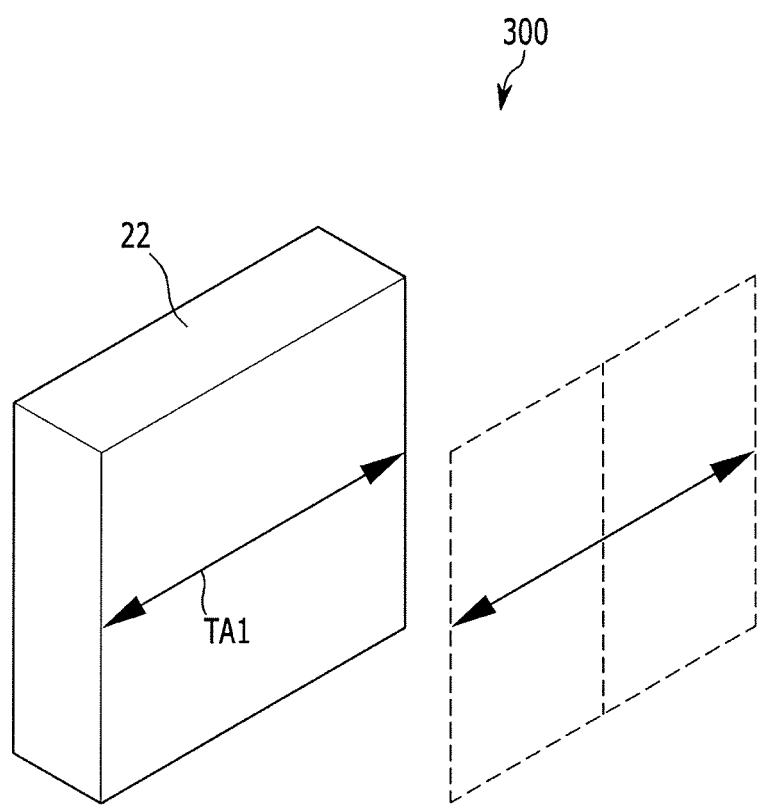
FIG. 5 shows a polarization state of light output by a display panel of a multiview image displaying system according to an exemplary embodiment of the present inventive concept.
Figure 6:
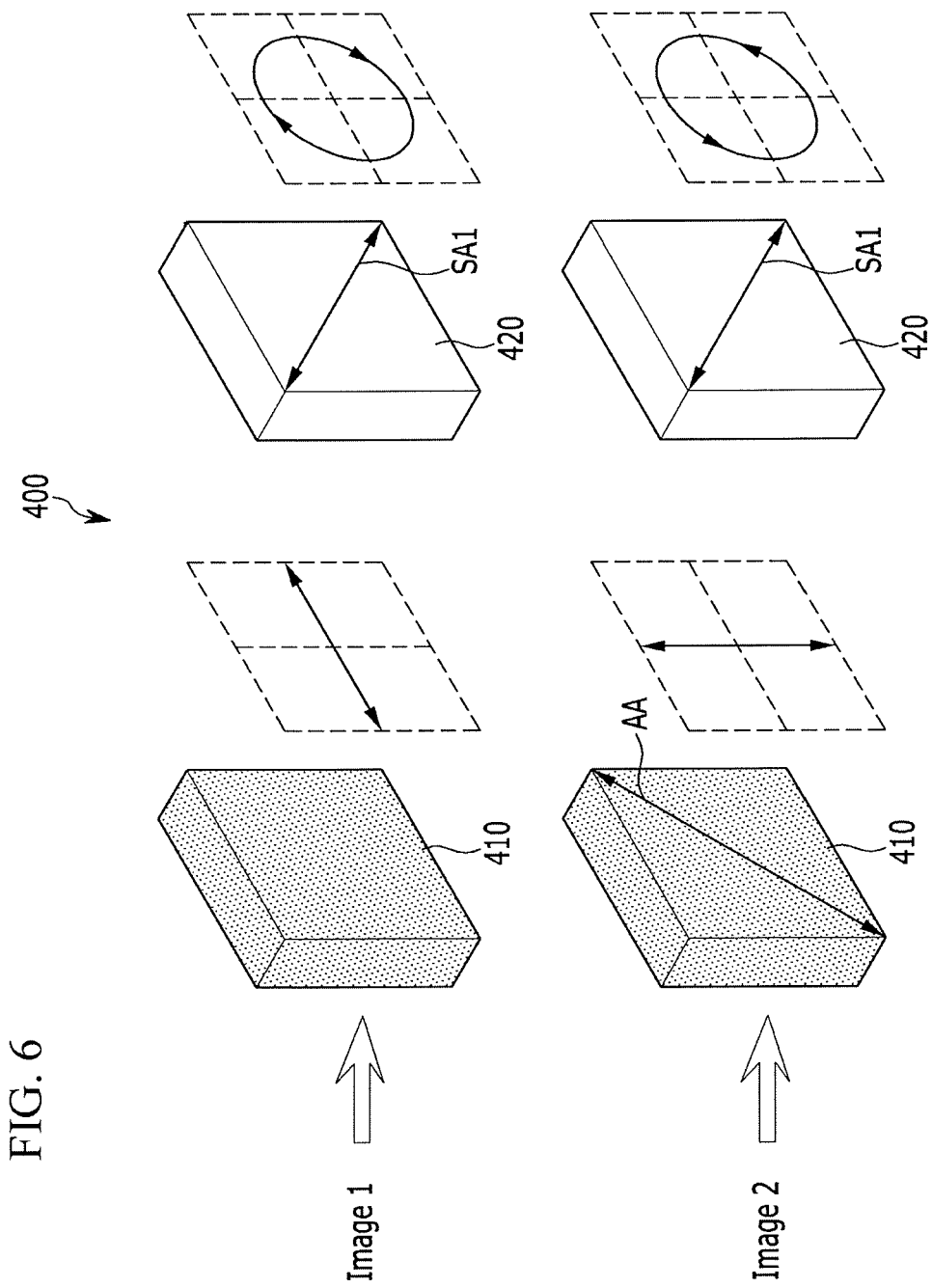
FIG. 6 shows a change of a polarization state of light input to a shutter panel of a multiview image displaying system according to an exemplary embodiment of the present inventive concept.
Figure 7:
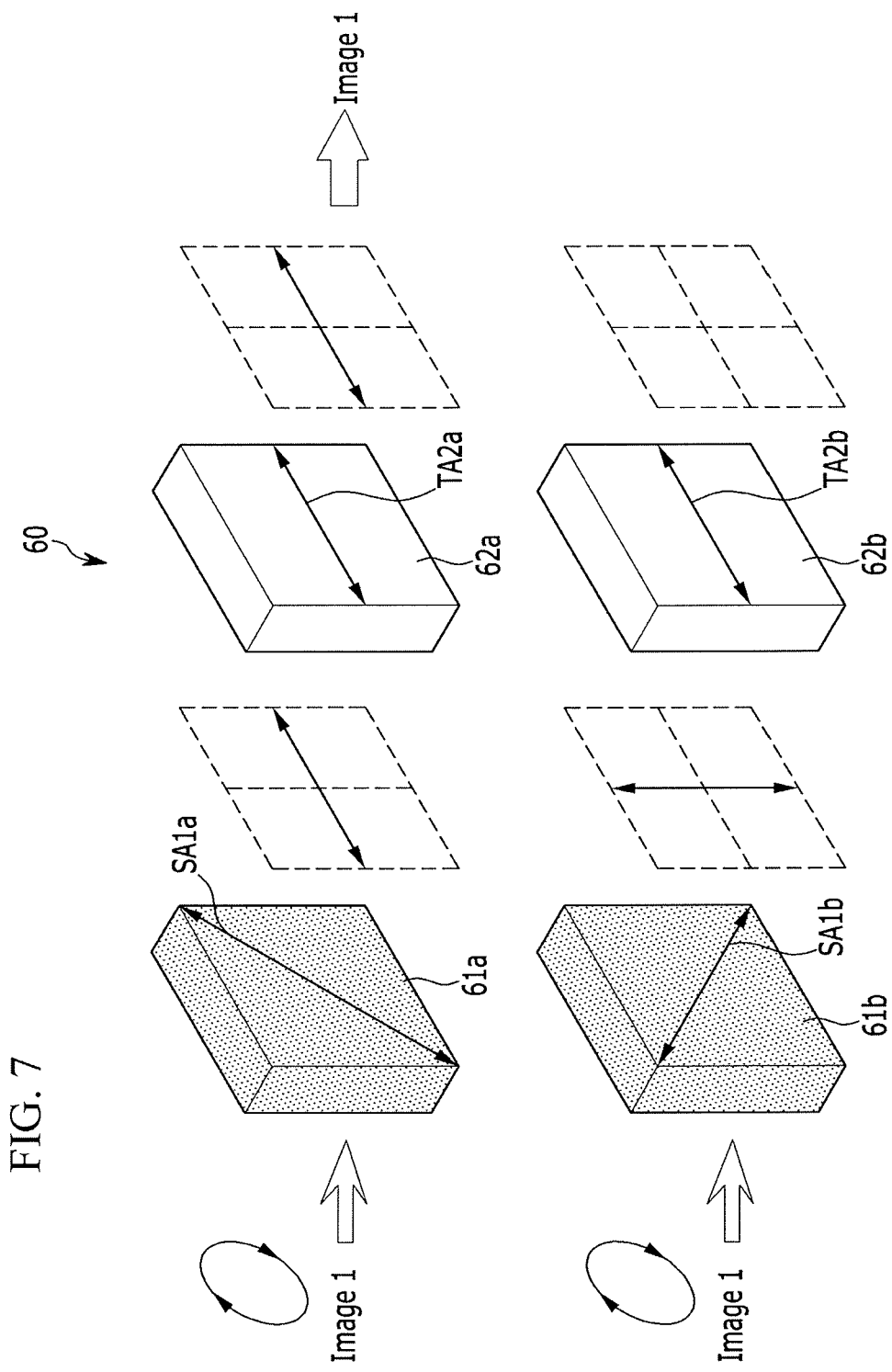
FIG. 7 and FIG. 8 show a change of a polarization state of light input to polarized glasses of a multiview image displaying system according to an exemplary embodiment of the present inventive concept.
Figure 8:
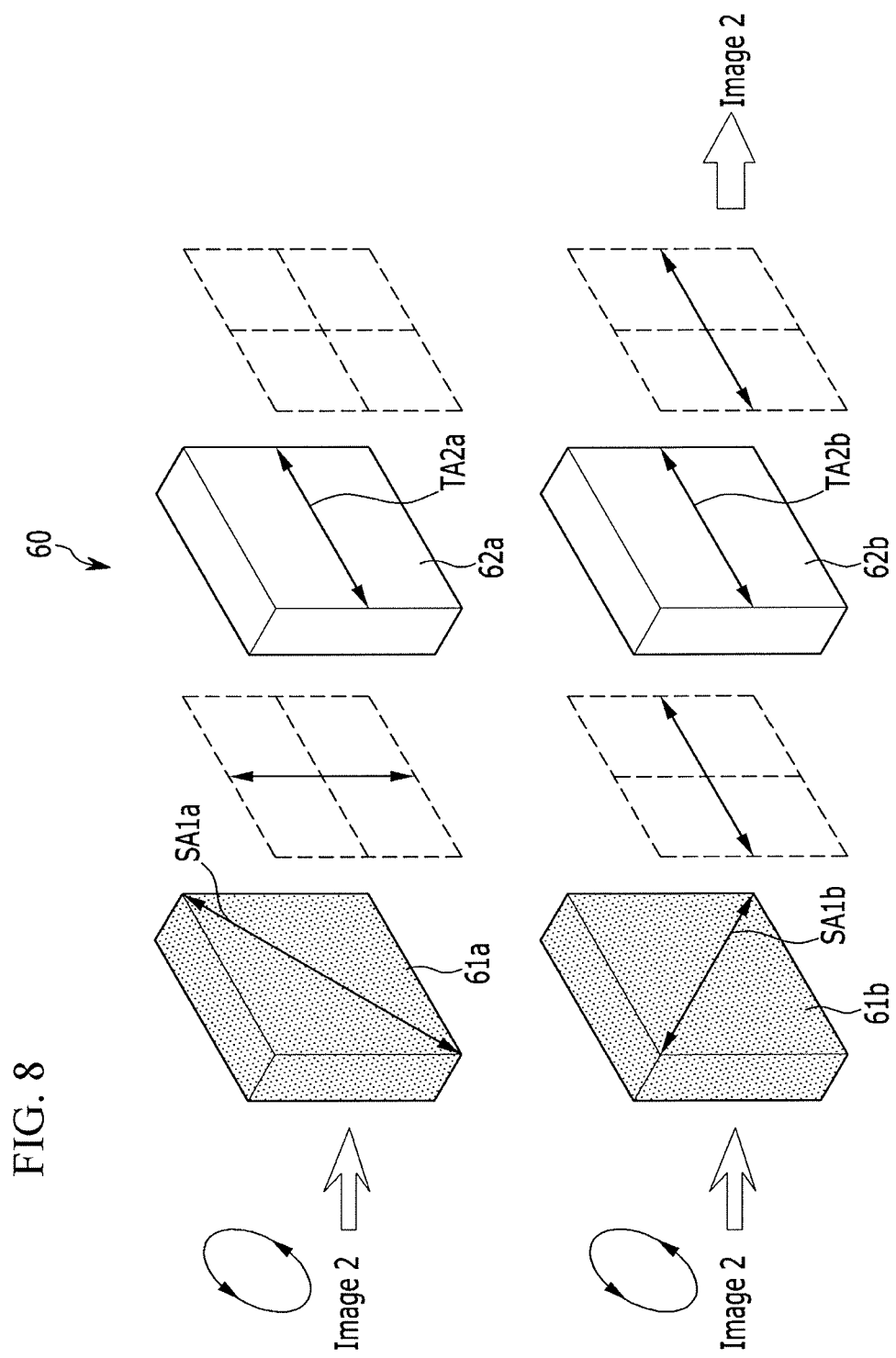

FIG. 5 shows a polarization state of light output by a display panel of a multiview image displaying system according to an exemplary embodiment of the present inventive concept, FIG. 6 shows a change of a polarization state of light input to a shutter panel of a multiview image displaying system according to an exemplary embodiment of the present inventive concept, and FIG. 7 and FIG. 8 show a change of a polarization state of light input to polarized glasses of a multiview image displaying system according to an exemplary embodiment of the present inventive concept.

The images that are displayed at different viewpoints will be called a first image and a second image, and in the case of the 3D image display mode, the first image is a left-eye image and the second image is a right-eye image, or vice versa. The display panel 300 displays the first image and the second image according to time division, and for ease of understanding, the first image and the second image will be described to be alternately displayed.

Referring to FIG. 5, when the display panel 300 displays the first image or the second image, the first image or the second image is linearly polarized in a direction that is parallel with the transmissive axis TA1 of the first polarizer 22 by the first polarizer 22 of the display panel 300. The case in which the transmissive axis TA1 of the first polarizer 22 is 0 degree that is a horizontal direction will be exemplarily described. Referring to FIG. 6, the active shutter panel 410 of the shutter panel 400 is driven to generate the phase difference of 0 degree in synchronization with a section (e.g., a time period) in which the display panel 300 displays the first image. On the contrary, the active shutter panel 410 of the shutter panel 400 can be driven to generate a phase difference of a half wave (λ/2) in synchronization with a section (e.g., a time period) in which the display panel 300 displays the second image. However, the active shutter panel 410 can also be driven so that an opposite phase difference may be assigned to the first image and the second image.

The phase of light passing through the active shutter panel 410 is not changed during the period in which the first image is displayed, so the polarization state of 0 degree is maintained, and the light is passed through the phase retardation plate 420, a quarter wave plate, and is then circularly polarized. In the present exemplary embodiment, the optical axis SA1 of the phase retardation plate 420 or a slow axis will be described to be substantially inclined by 135 degrees (or −45 degrees) with respect to the horizontal direction. Therefore, the first image having passed through the phase retardation plate 420 is right-circularly polarized.

On the contrary, the active shutter panel 410 of the shutter panel 400 can be driven to generate a phase difference of a half wave ($\lambda/2$) in synchronization with the time period in which the display panel 300 displays a second image. In this case, as shown in FIG. 6, an optical axis (AA) of the active shutter panel 410 forms an angle of substantially +45 degrees with respect to the horizontal direction.

The phase change of the light passing through the active shutter panel 410 is a half wave ($\lambda/2$) during the period in which the second image is displayed, so the polarization direction of the light having passed through the active shutter panel 410 is changed in the 90-degree direction, and the light passes through the phase retardation plate 420, a quarter wave plate, and is then circularly polarized. The present exemplary embodiment describes the case in which the optical axis SA1 of the phase retardation plate 420 or a slow axis is inclined by substantially 135 degrees (or −45 degrees) with respect to the horizontal direction, so the second image having passed through the phase retardation plate 420 is left-circularly polarized.

Referring to FIG. 7, the right-circularly polarized first image having passed through the shutter panel 400 is passed through the phase delay unit 61a that is a quarter wave film or a quarter wave plate, and is then linearly polarized when input to the left glass 60a of the polarized glasses 60. When the optical axis (SA1a) of the phase delay unit 61a is inclined by +45 degrees with respect to the horizontal direction, the light is linearly polarized in the 0-degree direction, passes through the polarizer 62a, and is visible by the left eye of the observer. Here, the transmissive axis (TA2a) of the polarizer 62a corresponds to the polarization direction of the light having passed through the phase delay unit 61a.

Differing from this, when the right-circularly polarized first image having passed through the shutter panel 400 is input to the right glass 60b of the polarized glasses 60, it is linearly polarized through the phase delay unit 61b that is a quarter wave film or a quarter wave plate, but the optical axis (SA1b) of the phase delay unit 61b forms an angle of substantially 90 degrees with the optical axis (SA1a) of the phase delay unit 61a so it is linearly polarized in the 90-degree direction differing from the light that is input to the left glass 60a. In this case, the optical axis (SA1b) of the phase delay unit 61b is inclined by +135 degrees (or −45 degrees) with respect to the horizontal direction. The polarization direction of the linearly polarized light is perpendicular to the transmissive axis (TA2b) of the polarizer 62b so the linearly polarized light is blocked by the polarizer 62b and is not visible by the right eye of the observer.

Therefore, the observer views the first image with the left eye when it is a left-eye image.

Referring to FIG. 8, when the left-circularly polarized second image having passed through the shutter panel 400 is input to the left glass 60a of the polarized glasses 60, it is linearly polarized through the phase delay unit 61a that is a quarter wave film or a quarter wave plate. When the optical axis (SA1a) of the phase delay unit 61a is inclined by +45 degrees in the horizontal direction, the light is linearly polarized in the 90-degree direction. The polarization direction of the linearly polarized light is perpendicular to the transmissive axis (TA2a) of the polarizer 62a so the linearly polarized light is blocked by the polarizer 62a and is not visible by the left eye of the observer.

Differing from this, when the left-circularly polarized second image having passed through the shutter panel 400 is input to the right glass 60b of the polarized glasses 60, it is linearly polarized through the phase delay unit 61b that is a quarter wave film or a quarter wave plate, but since the optical axis (SA1b) of the phase delay unit 61b forms an angle of substantially 90 degrees with the optical axis (SA1a) of the phase delay unit 61a, the light is linearly polarized in the 0-degree direction differing from the light that is input to the left glass 60a. The linearly polarized light is passed through the polarizer 62b and is visible by the right eye of the observer. In this instance, the transmissive axis (TA2b) of the polarizer 62b corresponds to the polarization direction of the light having passed through the phase delay unit 61b.

Therefore, when the second image is a right-eye image, the observer views it with the right eye.

The observer views the right-eye image with the right-eye and the left-eye image with the left-eye thereby perceiving visual depth of images.

A principle for displaying an image when a multiview image displaying system according to an exemplary embodiment of the present inventive concept that uses shutter glasses 70 will be described with reference to FIG. 9 to FIG. 11 together with above-described FIG. 1 to FIG. 4.

Figure 9:
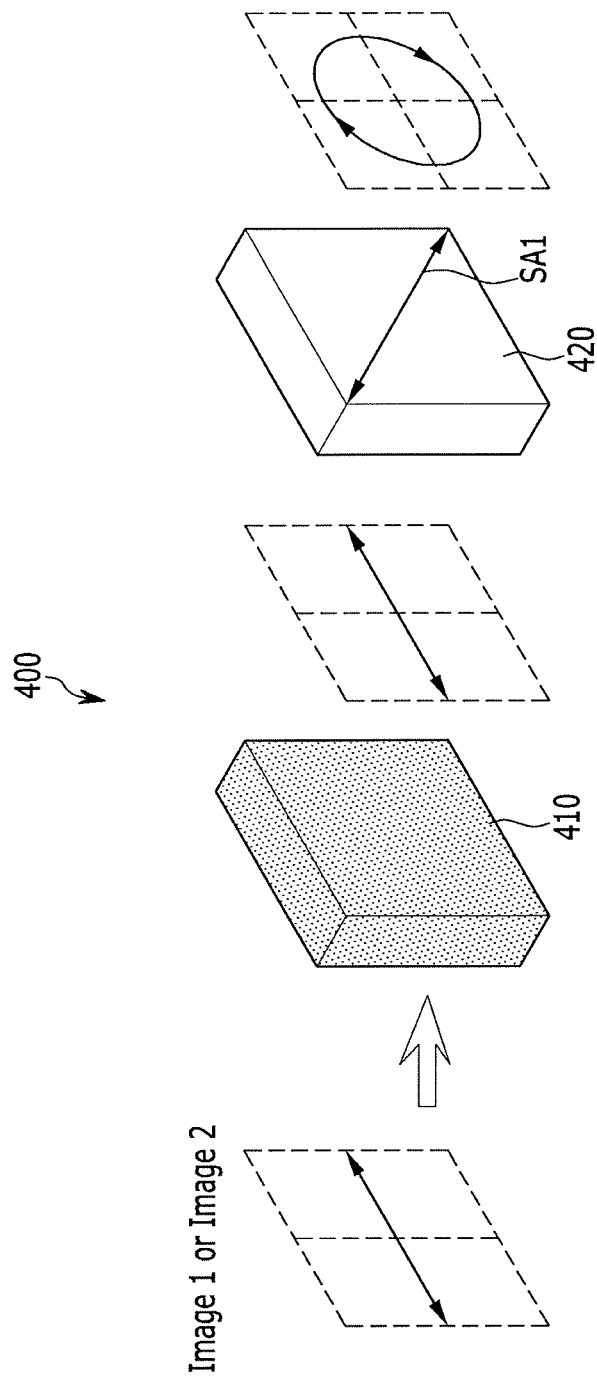
FIG. 9 shows a change of a polarization state of light input to a shutter panel of a multiview image displaying system according to an exemplary embodiment of the present inventive concept.
Figure 10:
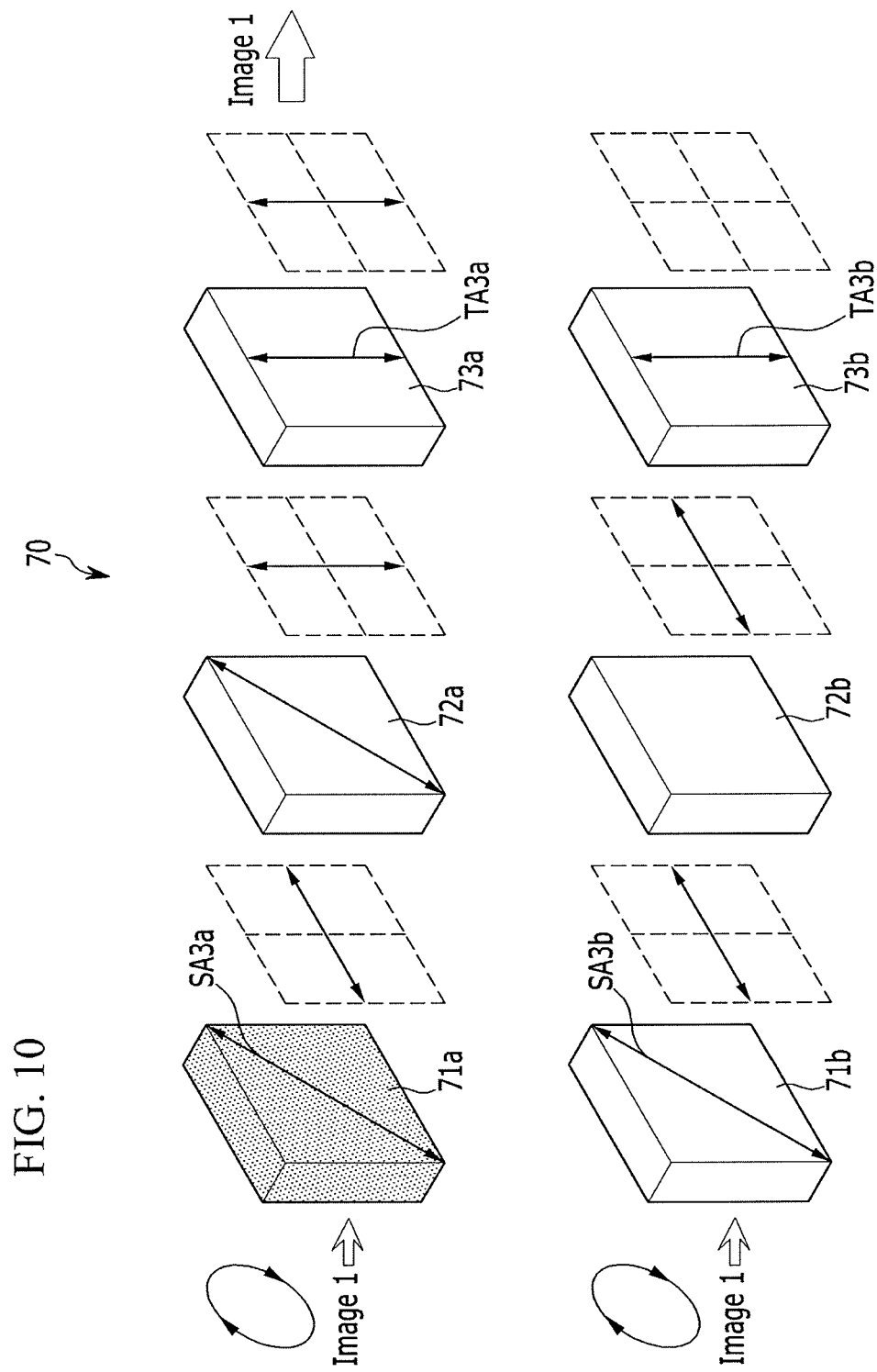
FIG. 10 and FIG. 11 show a change of a polarization state of light input to shutter glasses of a multiview image displaying system according to an exemplary embodiment of the present inventive concept.
Figure 11:
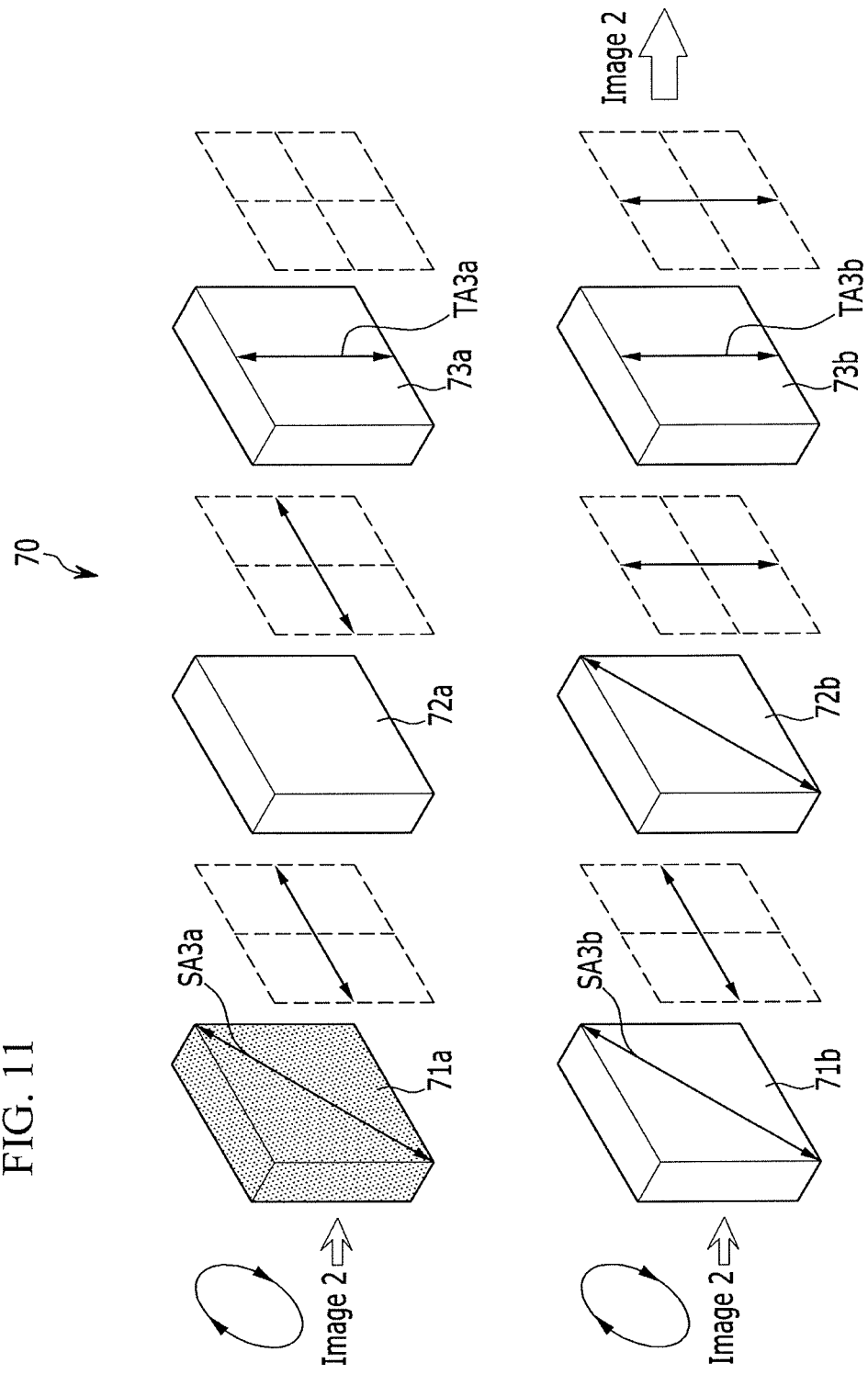

FIG. 9 shows a change of a polarization state of light input to a shutter panel of a multiview image displaying system according to an exemplary embodiment of the present inventive concept, and FIG. 10 and FIG. 11 show a change of a polarization state of light input to shutter glasses of a multiview image displaying system according to an exemplary embodiment of the present inventive concept.

In a like manner of the above description, the images that are displayed at different viewpoints are classified as a first image and a second image, and in the case of the 3D image display mode, the first image is a left-eye image and the second image is a right-eye image, or vice versa. The display panel 300 displays the first image and the second image according to time division, and for ease of understanding, the first image and the second image will be described to be alternately displayed.

Referring to FIG. 9, when the display panel 300 displays the first image or the second image, the first image or the second image is linearly polarized to the transmissive axis TA1 of the first polarizer 22 by the first polarizer 22 of the display panel 300. The case in which the transmissive axis TA1 of the first polarizer 22 is 0 degree that is a horizontal direction will be exemplarily described.

When the shutter glasses 70 are used, the active shutter panel 410 of the shutter panel 400 is driven to constantly provide the phase difference of 0 degree. Hence, as shown in FIG. 9, the polarization state of the first image or the second image having passed through the active shutter panel 410 is maintained.

The light having passed through the active shutter panel 410 is circularly polarized when passing through the phase retardation plate 420 that is a quarter wave plate. The present exemplary embodiment describes the case in which the optical axis SA1 or the slow axis of the phase retardation plate 420 is inclined by substantially 135 degrees (or −45 degrees) with respect to the horizontal direction, so the first image or the second image having passed through the phase retardation plate 420 is right-circularly polarized.

Referring to FIG. 10, the right-circularly polarized first image having passed through the shutter panel 400 is input to the left glass 70a of the shutter glasses 70. The light that is input to the left glass 70a is linearly polarized through the phase delay unit 71a that is a quarter wave film or a quarter wave plate. When the optical axis (SA3a) of the phase delay unit 71a is inclined by +45 degrees with respect to the horizontal direction, the light is linearly polarized in the 0-degree direction and is input to the left-eye shutter 72a.

When the display panel 300 is synchronized with a section for displaying the first image and the left-eye shutter 72a is turned on, the light passing through the left-eye shutter 72a generates a phase delay, and when the phase delay value is a half wave ($\lambda/2$), the first image having passed through the left-eye shutter 72a changes the polarization direction and is linearly polarized in the 90-degree direction. The linearly polarized first image is passed through the polarizer 73a and is visible by the left eye of the observer. In this instance, the transmissive axis (TA3a) of the polarizer 73a corresponds to the polarization direction of the light having passed through the left-eye shutter 72a.

Differing from this, when the right-circularly polarized first image having passed through the shutter panel 400 is input to the right glass 70b of the shutter glasses 70, it is linearly polarized through the phase delay unit 71b that is a quarter wave film or a quarter wave plate. The optical axis (SA3b) of the phase delay unit 71b substantially corresponds to the optical axis (SA3a) of the phase delay unit 71a so the first image is linearly polarized in the 0-degree direction in a like manner of the light that is input to the left glass 70a, and is then input to the right-eye shutter 72b. In this case, the optical axis (SA3b) of the phase delay unit 71b is inclined by +45 degrees from the horizontal direction.

When the display panel 300 is synchronized with the section for displaying the first image and the right-eye shutter 72b is turned off, the light passing through the right-eye shutter 72b does not generate a phase delay and the polarization direction of the first image having passed through the right-eye shutter 72b is maintained. The linearly polarized first image is blocked by the polarizer 73b and is not visible by the right eye of the observer. In this instance, the transmissive axis (TA3b) of the polarizer 73b is perpendicular to the polarization direction of the light having passed through the right-eye shutter 72b.

Therefore, the display panel 300 is synchronized with the section for displaying the first image and the left glass 70a of the shutter glasses 70 is turned on, and when the first image is a left-eye image, the observer views it with the left eye.

Referring to FIG. 11, in the section for displaying a second image, the right-circularly polarized second image having passed through the shutter panel 400 is input to the left glass 70a of the shutter glasses 70. The light input to the left glass 70a is linearly polarized through the phase delay unit 71a that is a quarter wave film or a quarter wave plate. Since the optical axis (SA3a) of the phase delay unit 71a is inclined by +45 degrees from the horizontal direction, the light is linearly polarized in the 0-degree direction and is input to the left-eye shutter 72a.

The display panel 300 is synchronized with the section for displaying the second image and the left-eye shutter 72a is turned off, so the light passing through the left-eye shutter 72a does not generate a phase delay and the polarization direction of the second image having passed through the left-eye shutter 72a is maintained. The linearly polarized second image is blocked by the polarizer 73a and is not visible by the left eye of the observer. In this instance, the transmissive axis (TA3a) of the polarizer 73a is perpendicular to the polarization direction of the light having passed through the left-eye shutter 72a.

Differing from this, when the right-circularly polarized second image having passed through the shutter panel 400 is input to the right glass 70b of the shutter glasses 70, it is linearly polarized through the phase delay unit 71b that is a quarter wave film or a quarter wave plate. Since the optical axis (SA3b) of the phase delay unit 71b substantially corresponds to the optical axis (SA3a) of the phase delay unit 71a, the second image is linearly polarized in the 0-degree direction in a like manner of the light input to the left glass 70a, and is then input to the right-eye shutter 72b. In this case, the optical axis (SA3b) of the phase delay unit 71b is inclined by +45 degrees from the horizontal direction.

When the display panel 300 is synchronized with the section for displaying the second image and the right-eye shutter 72b is turned on, the light passing through the right-eye shutter 72b generates a phase delay, and when the phase delay value is a half wave ($\lambda/2$), the second image having passed through the right-eye shutter 72b changes the polarization direction and is linearly polarized in the 90-degree direction. The linearly polarized second image is passed through the polarizer 73b and is visible by the right eye of the observer. In this instance, the transmissive axis (TA3b) of the polarizer 73b corresponds to the polarization direction of the light having passed through the right-eye shutter 72b.

Therefore, the display panel 300 is synchronized with the section for displaying the second image and the right glass 70b of the shutter glasses 70 is turned on, and when the second image is a right-eye image, the observer views it with the right eye.

The observer accordingly views the right-eye image with the right eye and the left-eye image with the left eye thereby perceiving the visual depth of the images.

Particularly, when the shutter glasses 70 are used and the first image and the second image are different images that are observed at different viewpoints, observers at different positions observe different images. In this case, the shutter glasses 70 used by the different observers are alternately turned on/off, and the left glass 70a and the right glass 70b of the shutter glasses 70 of one observer are simultaneously turned on/off.

A multiview image displaying system according to an exemplary embodiment of the present invention will now be described with reference to FIG. 12 and the above-described drawings.

Figure 12:
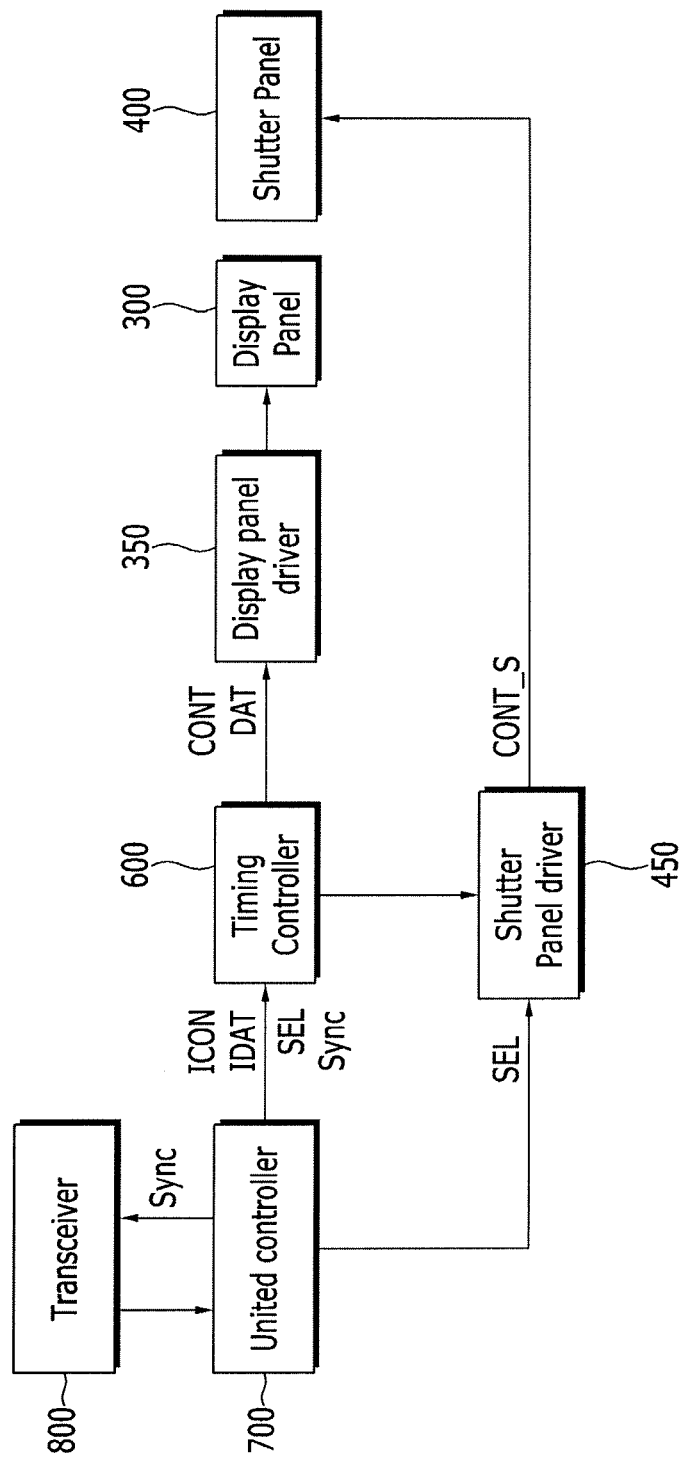
FIG. 12 shows a block diagram of a multiview image displaying system according to an exemplary embodiment of the present inventive concept.

FIG. 12 shows a block diagram of a multiview image displaying system according to an exemplary embodiment of the present inventive concept.

Referring to FIG. 12, the multiview image displaying system includes a display panel 300, a display panel driver 350, a shutter panel 400, a shutter panel driver 450, a signal controller 600 (e.g., a timing controller), a united controller 700, and a transceiver 800.

The shutter panel 400 of the display panel 300 corresponds to the above-described exemplary embodiment.

The transceiver 800 is included in the multiview image displaying system when the observer uses the shutter glasses 70, and it transmits an input signal of the observer to the united controller 700 in a radio manner. For example, the transceiver 800 can wirelessly transmit the input signal to the controller 700 using radio waves/signals in various communication formats such as BLUETOOTH. In an exemplary embodiment, the transceiver 800 is attached to the shutter glasses 70.

The united controller 700 receives image information from an external device to generate an input image signal (IDAT) and an input control signal (ICON), and transmits them to the signal controller 600. Further, the united controller 700 generates a mode selection signal (SEL) according to external glasses mode selection information and transmits the same to the signal controller 600 and the shutter panel driver 450. The mode selection information can be input from the transceiver 800. The mode selection signal (SEL) includes information on the display modes, such as a 2D image display mode, a 3D image display mode, or a multiview display mode.

The united controller 700 generates a synchronization signal Sync and transmits it to the transceiver 800 or the shutter glasses 70 and the signal controller 600. The shutter glasses 70 and the signal controller 600 are synchronized with each other and are operable by the synchronization signal Sync. According to the exemplary embodiment shown in FIG. 12, the signal controller 600 controls the display panel driver 350 and the shutter panel driver 450 according to the synchronization signal Sync so that the display panel driver 350 and the shutter panel driver 450 are synchronized with each other and are operable, and differing from this, the united controller 700 can transmit the synchronization signal Sync to the signal controller 600 and the shutter panel driver 450.

The signal controller 600 controls the display panel driver 350 and the shutter panel driver 450. The signal controller 600 is operable by a mode selection signal (SEL) provided by the united controller 700, and it uses an input image signal (IDAT) and an input control signal (ICON) to generate an output image signal DAT and a driving control signal CONT and transmit them to the display panel driver 350.

The display panel driver 350 applies a driving signal to the display panel 300 according to the driving control signal CONT and output image signal DAT from the signal controller 600 so that the display panel 300 displays an image according to the display mode. The display panel driver 350 includes a driving circuit for applying a driving signal to a signal line of the display panel 300.

The shutter panel driver 450 transmits a shutter control signal (CONT_S) to the shutter panel 400 in synchronization with the display panel driver 350 by control of the signal controller 600. The shutter panel 400 is driven by the shutter control signal (CONT_S) and is switched to alternately generate different phase differences, or it is driven to generate a constant phase difference. In an exemplary embodiment, the shutter control signal (CONT_S) is a first voltage to turn on the shutter panel 400 and a second other voltage to turn off the shutter panel 400.

A method for driving a multiview image displaying system according to an exemplary embodiment of the present inventive concept, particularly, a method for driving a shutter panel 400, will now be described with reference to FIG. 12 and FIG. 13.

Figure 13A:
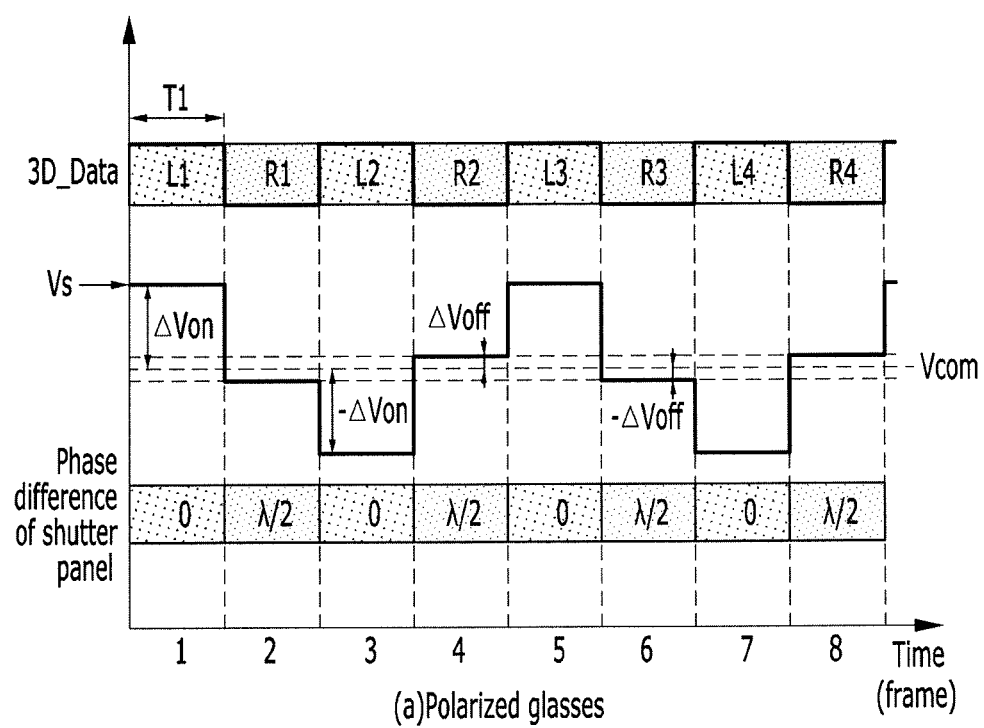
FIG. 13A and FIG. 13B illustrate waveform diagrams of a driving signal when polarized glasses or shutter glasses are used in a multiview image displaying system according to an exemplary embodiment of the present inventive concept.
Figure 13B:
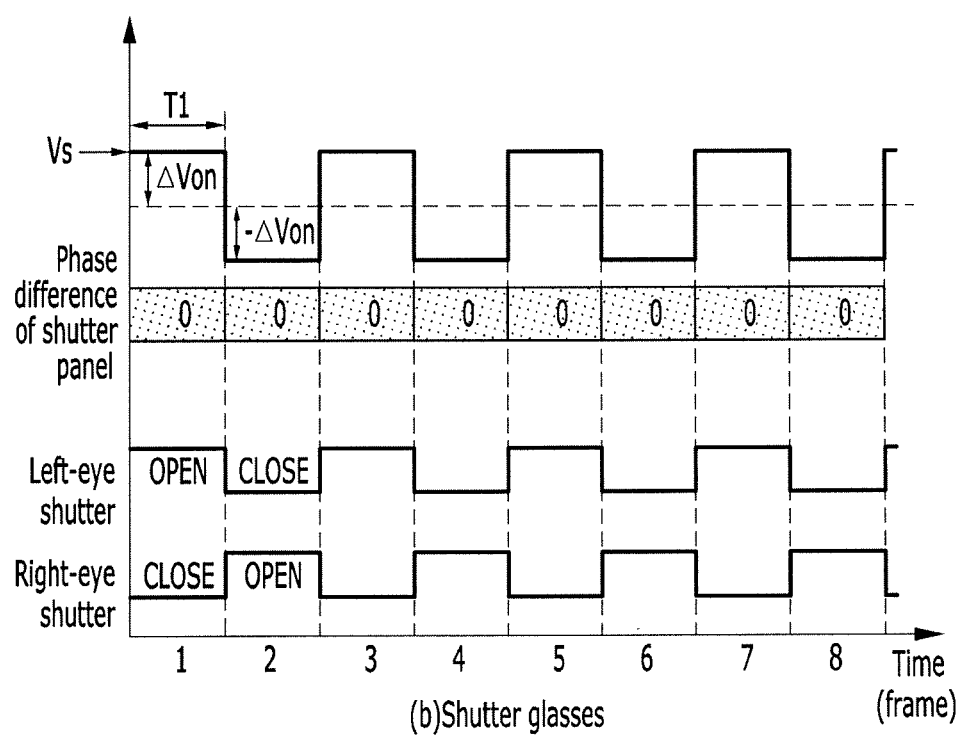

FIG. 13A is a waveform diagram of a driving signal when polarized glasses are used by a multiview image displaying system according to an exemplary embodiment of the present inventive concept. FIG. 13B is a waveform diagram of a driving signal when shutter glasses are used by a multiview image displaying system according to an exemplary embodiment of the present inventive concept.

Referring to FIG. 13A and FIG. 13B, the display panel 300 alternately displays different images, for example, the images at different viewpoints, or in further detail, left-eye images (L1, L2, . . . ) and right-eye images (R1, R2, . . . ). The left-eye images (L1, L2, . . . ) and the right-eye images (R1, R2, . . . ) configure 3D data (3D_Data). A period T1 for displaying the left-eye images (L1, L2, . . . ) or the right-eye images (R1, R2, . . . ) of one frame is about $\frac{1}{120}$ of a second, but it is not limited thereto.

The shutter panel 400 receives a voltage and is operated in synchronization with a display operation of the display panel 300.

As shown in FIG. 13A, when the polarized glasses 60 are selected, the shutter panel 400 is alternately and repeatedly turned to the on state and the off state to alternately assign the 0-degree phase difference and the half-wave phase difference each time the display panel 300 newly displays the image at different viewpoints, that is, the left-eye images (L1, L2, . . . ) or the right-eye images (R1, R2, . . . ). For example, the phase difference generated when the shutter panel 400 is turned on is substantially 0 degree in the frame for displaying the left-eye images (L1, L2, . . . ), and the phase difference generated when the shutter panel 400 is turned off is substantially a half wave in the frame for displaying the right-eye images (R1, R2, . . . ), and vice versa.

A voltage (Vs) supplied to the shutter panel 400 when the shutter panel 400 is turned on is a positive polarity on voltage ($\Delta$Von) or a negative polarity on voltage ($-\Delta$Von) with reference to a common voltage Vcom. A voltage (Vs) supplied to the shutter panel 400 when the shutter panel 400 is turned off is a positive polarity off voltage ($\Delta$Voff) or a negative polarity off voltage ($-\Delta$Voff) with reference to the common voltage Vcom. The off voltage ($\Delta$Voff) is greater than 0 volt and less than a threshold voltage (Vth) by which the shutter panel 400 is turned on. In an exemplary embodiment, a transistor is used to turn on/off the shutter panel 400 and the threshold voltage Vth is the threshold voltage of the transistor. When the voltage (Vs) is greater than the common voltage Vcom, it is called positive polarity, and when the voltage (Vs) is less than the common voltage Vcom, it is called negative polarity.

Degradation of the shutter panel 400 is prevented by periodically changing polarity of the voltage (Vs) supplied to the shutter panel 400. Particularly, when the shutter panel 400 includes a liquid crystal layer, degradation of the liquid crystal layer is prevented by supplying a polarity-inverted voltage (Vs).

When the shutter glasses 70 are selected as shown in FIG. 13B, the shutter panel 400 maintains an on state to constantly provide the 0-degree phase difference. The voltage (Vs) supplied to the shutter panel 400 is an on voltage ($\Delta$Von) or a negative on voltage ($-\Delta$Von) with reference to the common voltage Vcom. Particularly, to prevent degradation of the shutter panel 400, the voltage (Vs) is polarity-inverted for each predetermined period, and the predetermined period is not restricted to one frame and can be a plurality of frames. A polarity inverted frequency of the voltage (Vs) is substantially 60 Hz, but is not restricted to this. For example, the frequency can be further reduced to 30 Hz or 15 Hz or can be increased in consideration of power consumption of the shutter panel 400.

As shown in FIG. 13B, the shutter glasses 70 are operable in synchronization with an operation of the shutter panel 400. When the left-eye images (L1, L2, . . . ) are displayed, the left-eye shutter 72a of the left glass is turned on and opened and the left eye of the observer observes the left-eye images (L1, L2, . . . ). In this instance, the right-eye shutter 72b is turned off and is closed. When the right-eye images (R1, R2, . . . ) are displayed, the right-eye shutter 72b of the right glass are turned on and opened, and the right eye of the observer observes the right-eye images (R1, R2, . . . ). In this instance, the left-eye shutter 72a is turned off and is closed.

A method for driving a shutter panel 400 when a multi-view image displaying system according to an exemplary embodiment of the present inventive concept uses shutter glasses will now be described with reference to FIG. 12 to FIG. 14.

Figure 14:
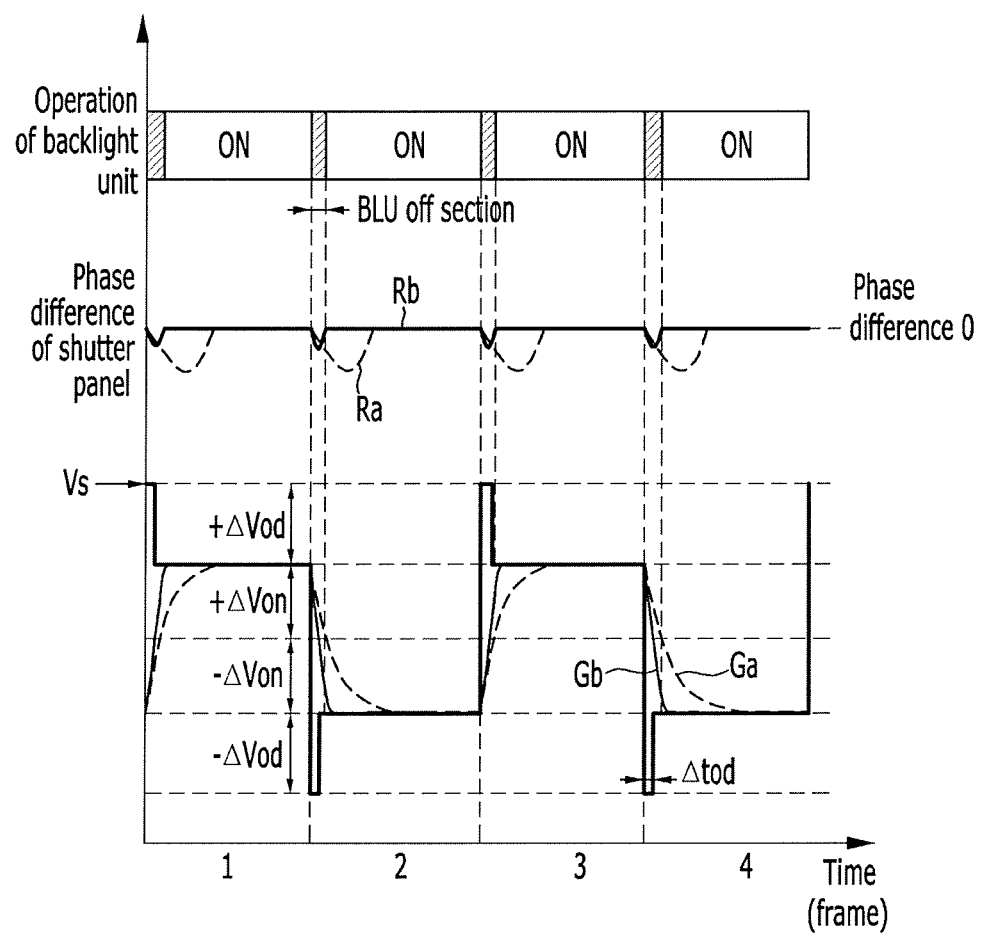
FIG. 14 shows a waveform diagram of a driving voltage applied to a shutter panel and a phase difference of a shutter panel when shutter glasses are used in a multiview image displaying system according to an exemplary embodiment of the present inventive concept.

FIG. 14 shows a waveform diagram of a driving voltage applied to a shutter panel and a phase difference of a shutter panel when shutter glasses are used by a multiview image displaying system according to an exemplary embodiment of the present inventive concept.

Referring to FIG. 14, the display panel 300 includes a backlight unit (not shown) for supplying the light as a non-emissive display device, and the backlight unit (BLU) is repeatedly turned to the off/on states for a predetermined period as shown in FIG. 14. The on/off period is a period for the display panel 300 to display images at different view-points, and for example, it is one frame. When the image displayed by the display panel 300 is changed, the backlight unit (BLU) is turned off to reduce crosstalk between images of neighboring frames.

When the shutter glasses 70 are used and a polarity inverted voltage (Vs) such as a waveform shown in FIG. 13A and FIG. 13B is supplied to the shutter panel 400, the voltage is delayed and supplied to the shutter panel 400 by an RC delay of the shutter panel 400 as shown by a curve (Ga) of FIG. 14. Accordingly, a response speed of liquid crystal molecules of the shutter panel 400 slows down so a degree and a section for not realizing the 0-degree phase difference of the shutter panel 400 as shown by a curve (Ra) are increased. Particularly, as a size of the shutter panel 400 becomes bigger, the reaction speed of the shutter panel 400 induced by the RC delay is reduced and it becomes difficult to realize a constant 0-degree phase difference.

However, as shown in FIG. 14, the voltage (Vs) supplied to the shutter panel 400 is not polarity-inverted between the positive polarity on voltage (ΔVon) and the negative polarity on voltage (−ΔVon), and a positive polarity overvoltage (ΔVod) is added to the positive polarity on voltage (ΔVon) and is applied at a polarity inverting time or a negative polarity overvoltage (−ΔVod) is added to the negative polarity on voltage (−ΔVon) and is applied thereby overdriving the shutter panel 400 at polarity inversion.

When the shutter panel 400 is overdriven at polarity inversion as described above, the voltage transmitted to the shutter panel 400 as shown in the curve (Gb) of FIG. 14 is changed more quickly than the curve (Ga) to increase the response speed of the shutter panel 400. Accordingly, the degree and the section for the phase difference of the shutter panel 400 to fail to realize 0 degree are substantially reduced as shown by the curve (Rb) to substantially maintain the 0-degree phase difference and increase the quality of the images observed through the multiview image displaying system.

Sizes of the positive polarity overvoltage (ΔVod) or the negative polarity overvoltage (−ΔVod) and a time (Δtod) of an overdriving section are controllable according to design conditions of the shutter panel 400, and particularly they are set to minimize the RC delay. The time (Δtod) of the overdriving section is less than a half of the section for displaying an image at a viewpoint.

When there is a section in which the phase difference of the shutter panel 400 is not 0 degree at a polarity inverting time of the voltage (Vs), as shown in FIG. 14, a polarity inverting and/or overdriving section of the voltage (Vs) is set to be provided in a section in which the backlight unit (BLU) is turned off.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure.

What is claimed is:

1. A multiview image displaying system comprising:
a display panel for displaying images for different viewpoints by time division and including a first polarizer;
a shutter panel provided in front of the display panel and including an active shutter panel and a phase retardation plate, wherein the active shutter panel is disposed between the phase retardation plate and the display panel;
a shutter panel driver for supplying a voltage to the shutter panel so that the shutter panel is synchronized with the display panel;
a signal controller for controlling the shutter panel driver; and
glasses for observing the images,
wherein the glasses are selected from among polarized glasses and shutter glasses for the same display panel and the same shutter panel,
wherein the signal controller is operable by a selection signal indicating which one of the polarized glasses and the shutter glasses is selected.

2. The multiview image displaying system of claim 1, wherein the shutter panel driver is configured to alternately realize a 0-degree phase difference and a half-wave phase difference when the polarized glasses are selected.

3. The multiview image displaying system of claim 2, wherein the polarized glasses include a first glass and a second glass, the first glass and the second glass respectively include a phase delay unit and a polarizer, the phase delay unit includes a quarter wave plate or a quarter wave film and a transmissive axis of the polarizer included by the first glass substantially corresponds to a transmissive axis of the polarizer included by the second glass.

4. The multiview image displaying system of claim 3, wherein an optical axis of the phase delay unit included by the first glass and an optical axis of the phase delay unit included by the second glass form an angle of substantially 90 degrees.

5. The multiview image displaying system of claim 4, wherein the phase retardation plate includes a quarter wave plate, and an optical axis of the phase retardation plate is substantially parallel with one of the optical axis of the phase delay unit included by the first glass and the optical axis of the phase delay unit included by the second glass, and it forms an angle of substantially 90 degrees with the other thereof.

6. The multiview image displaying system of claim 1, wherein the shutter panel constantly realizes substantially a 0-degree phase difference when the shutter glasses are selected.

7. The multiview image displaying system of claim 6, wherein the shutter glasses include a first glass and a second glass, the first glass and the second glass respectively include a phase delay unit, a shutter, and a polarizer, the phase delay unit includes a quarter wave plate or a quarter wave film and a transmissive axis of the polarizer included by the first glass substantially corresponds to a transmissive axis of the polarizer included by the second glass.

8. The multiview image displaying system of claim 7, wherein an optical axis of the phase delay unit included by the first glass is substantially parallel with an optical axis of the phase delay unit included by the second glass.

9. The multiview image displaying system of claim 8, wherein the shutter is alternately turned on and off in synchronization with the display panel to alternately provide different phase differences to incident light.

10. The multiview image displaying system of claim 9, wherein the phase retardation plate includes a quarter wave plate.

11. The multiview image displaying system of claim 1, further comprising:
a display panel driver for driving the display panel,
wherein the signal controller is also for controlling the display panel driver.

12. The multiview image displaying system of claim 11, wherein the shutter panel driver supplies a polarity inverted voltage to the shutter panel when the shutter glasses are selected.

13. The multiview image displaying system of claim 12, wherein, when the shutter glasses are selected, an overvoltage is added for a predetermined time to the polarity inverted voltage supplied by the shutter panel driver.

14. The multiview image displaying system of claim 13, wherein the display panel further includes a backlight unit, and a time period in which the polarity inverted voltage is supplied by the shutter panel driver overlaps a time period in which the backlight unit is turned off.

15. A method for driving a multiview image displaying system comprising:
driving a display panel to alternately display images of different viewpoints;
supplying polarity-varying voltages between a positive voltage and a negative voltage to a shutter panel provided in front of the display panel to generate a substantially constant phase difference for a plurality of frames; and
driving shutter glasses to allow an image that has passed through the shutter panel to pass through the shutter glasses,
wherein the shutter glasses include a first glass and a second glass, the first glass and the second glass respectively include a phase delay unit, a shutter, and a polarizer, the phase delay unit includes a quarter wave plate or a quarter wave film and a transmissive axis of the polarizer included by the first glass substantially corresponds to a transmissive axis of the polarizer included by the second glass.

16. The method of claim 15, wherein an optical axis of the phase delay unit included by the first glass is substantially parallel with an optical axis of the phase delay unit included by the second glass.

17. The method of claim 16, further comprising alternately turning on and off the shutter in synchronization with the display panel to alternately provide different phase differences to incident light.

18. The method of claim 15, further comprising adding an overvoltage for a predetermined time to the polarity inverted voltage supplied to the shutter panel.

19. The method of claim 18, wherein the display panel further includes a backlight unit, and the method further comprises alternately turning on and off the backlight unit.

20. The method of claim 19, wherein a time period in which the polarity inverted voltage is supplied to the shutter panel overlaps a time period in which the backlight unit is turned off.

21. A display device comprising:
a display panel;
a first polarizer formed on a first side of the display panel;
an active shutter panel formed on the polarizer and configured to impart one of a phase difference of 0 degree and a phase difference of a half wave to light passing through the shutter panel according to a supplied voltage;
a quarter wave plate formed on the polarizer; and
a driver configured to provide polarity-varying voltages between a positive voltage and a negative voltage to the active shutter panel to constantly impart the 0 degree phase difference for a plurality of frames in response to a signal indicating a user is using shutter glasses.

22. The display device of claim 21, further comprising a second polarizer formed on a second other side of the display panel opposing the first side, wherein transmissive axes of the polarizers are orthogonal to each other.

23. The display device of claim 21, wherein the driver is configured to supply voltages to the active shutter panel to continuously alternate between imparting the 0 degree phase difference and the half wave phase difference in response to a signal indicating a user is using polarized glasses.

24. The display device of claim 23, further comprising a transceiver configured to wirelessly receive the signal from the polarized glasses or the shutter glasses.

* * * * *